June 3, 1969 T. L. VALLAS 3,448,258

TELEPHONE LIGHT

Filed Sept. 16, 1966

INVENTOR.
THEODORE L. VALLAS,

By
Herbert C. Schulze
ATTORNEY.

United States Patent Office 3,448,258
Patented June 3, 1969

3,448,258
TELEPHONE LIGHT
Theodore L. Vallas, 3202 Vista Way,
Oceanside, Calif. 92054
Filed Sept. 16, 1966, Ser. No. 579,937
Int. Cl. F21v 33/00
U.S. Cl. 240—2 1 Claim

ABSTRACT OF THE DISCLOSURE

A telephone book magnifying light attached to a telephone booth. An alignment device is incorporated with the magnifying glass of the light. A page of the book is scanned and retained in proper alignment under the magnifier for reference while dialing a number from a telephone booth.

This invention relates generally to lighting devices and more particularly to a new and improved telephone booth magnifying light.

I have observed that many people, especially upon reaching middle age, have difficulty reading telephone books. This is particularly true in poor light and under poor book handling conditions such as frequently exist in public telephone booths.

Also, I have found that once finding a number, many people will loose the number or forget it while they are inserting the coin into the telephone or speaking with the operator.

Further than this there are many occasions of distraction in a telephone booth, the dialing, finding the number busy, and other such circumstances which make it necessary for one to repeatedly look for the number in the book, frequently with repeated difficulty.

I have devised a new and improved telephone magnifying light to be used in a telephone booth for the purpose of making it easier for all persons to find and read telephone numbers in telephone books under such circumstances, and to retain and to mark them, whether at night or otherwise.

Thus, it is an object of this invention to provide a new and improved light for a telephone booth.

A further object of this invention is to provide a magnifying system for reading telephone numbers in telephone books.

It is a further object of this invention to provide a magnifying light which will make it easy to align numbers in telephone books, for dialing in telephone booths.

The foregoing and other objects and advantages of this invention will be clear to those skilled in the art upon reading the following specification in conjunction with the attached drawings, in which.

Figures 1, 2, 3, 4:
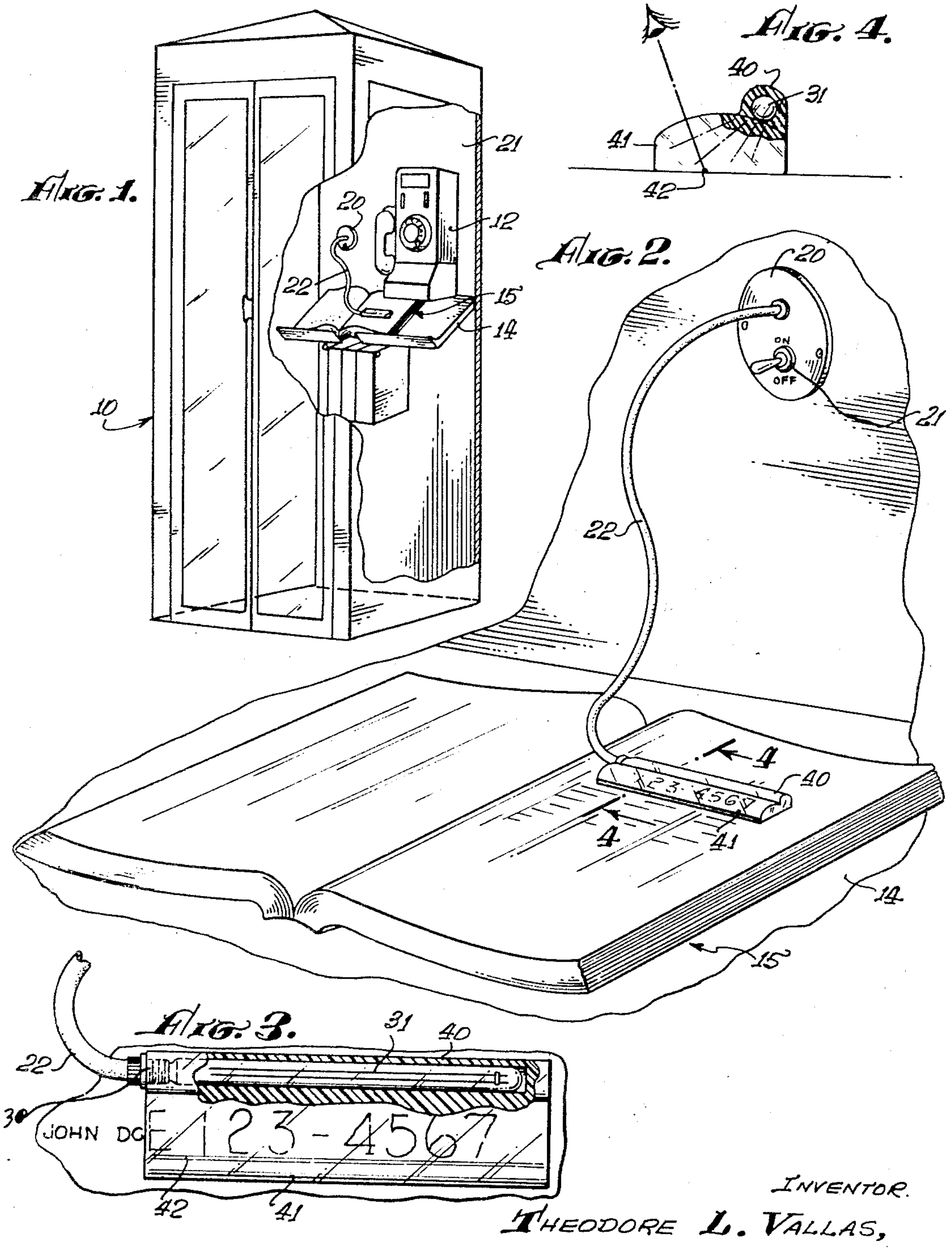
FIGURE 1 is a perspective of the interior of a telephone booth with a preferred embodiment of this invention in place.
FIGURE 2 is a close-up and enlarged view of the same embodiment of this device shown in FIGURE 1.
FIGURE 3 is an enlarged partially sectioned view of this device being used over a telephone book.
FIGURE 4 is a partial section through 4—4 on FIGURE 2.

It will be seen that this device may be attached to the wall, ceiling or other convenient location in a customary telephone booth 10. The device consists of a base

20 with a switch 21 and a flexible elongated neck 22 through which an electrical cord (not shown) passes and a light socket 30 with a light 31 therein at the end of the neck 22. Also attached at the end of the neck 22 is a shield 40 to prevent glare from reaching the eyes of the user, and a magnifying glass 41 with a line 42 across a portion of its lower surface for alignment over the telephone number once the same has been found. The magnifying glass is lighted by the light 31.

Thus it will be seen that when one has found the appropriate page in a telephone book 15, he may find the name with or without the magnifying glass. Then, the user may pull the light with its line guide directly over the number and the number will stay well illuminated until he has completed dialing his number on the telephone 12.

Because the magnifying light number finder is on a flexible neck, it may be left in position on the telephone book with the book opened on the telephone book shelf 14 for as long as desired during the use of the telephone. Thus, in case of difficulty, the enlarged illuminated figures in the book which have been previously aligned with the line may be rapidly used and reused. The flexible neck may be made of material stiff enough to hold itself and the magnifying light in position if desired so that the danger of inadvertent shifting will be minimized.

It will also be noted that, because of the ability of the light to pass through the magnifying glass, it may be held aloft over a page for general illumination during the initial phases of selecting the proper page and the name, address, and other data necessary. Thus, this object is useful as an extension light and at the same time as a magnifying number finder.

While the embodiment of this invention as specifically shown and described is fully capable of achieving the objects and advantages desired, it will be clear to those skilled in the art that many modifications may be made without departing from the inventive concepts disclosed herein. It is not my intention to be limited by the embodiment specifically described, which is for illustrative purposes only.

I claim:

1. The combination with a telephone booth of a light base attached to said booth, said light base being provided with switching means; an elongated flexible but semi-rigid tube attached to said light base and carrying electrical cord; a light attached to the other end of said flexible tube; a magnifying glass attached to said end of said flexible tube with said light and cooperating with the same so the said light shines in the area viewed through said magnifying glass; means to hold a telephone book in an open position such that all portions of the opened telephone book may be scanned by the said magnifying glass; and line indicating means in conjunction with the magnifying glass to line up upon a given place on said telephone book.

References Cited

UNITED STATES PATENTS

| | | | |
|---|---|---|---|
| 1,828,543 | 10/1931 | Phillips | 240—2.17 |
| 2,371,968 | 3/1945 | Lum | 240—2.17 XR |
| 2,384,528 | 9/1945 | Brandt | 240—2 XR |
| 2,586,723 | 2/1952 | Sakols | 350—237 |

NORTON ANSHER, *Primary Examiner.*

L. H. McCORMICK, Jr., *Assistant Examiner.*

U.S. Cl. X.R.

350—237